(12) United States Patent
Ambrose

(10) Patent No.: US 7,076,565 B2
(45) Date of Patent: *Jul. 11, 2006

(54) SWITCH NODE FOR CONNECTING A KEYBOARD VIDEO MOUSE TO SELECTED SERVERS IN A INTERCONNECTED SWITCH NODE NETWORK

(75) Inventor: David H. Ambrose, Monroe, CT (US)

(73) Assignee: Lantronix, Inc., Irvine, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 10/390,199

(22) Filed: Mar. 17, 2003

(65) Prior Publication Data

US 2003/0227929 A1  Dec. 11, 2003

Related U.S. Application Data

(63) Continuation of application No. 09/421,494, filed on Oct. 20, 1999, now Pat. No. 6,615,272.

(51) Int. Cl.
*G06F 15/173*  (2006.01)

(52) U.S. Cl. .................. 709/238; 709/219; 370/351; 370/400

(58) Field of Classification Search ................ 709/238, 709/219; 370/400, 401, 351, 463
See application file for complete search history.

(56) References Cited

U.S. PATENT DOCUMENTS

| 5,440,547 | A | * | 8/1995 | Easki et al. ............... 370/395.3 |
| 6,157,921 | A | * | 12/2000 | Barnhill ........................ 706/16 |
| 6,253,230 | B1 | | 6/2001 | Couland et al. ............ 709/203 |
| 6,304,549 | B1 | * | 10/2001 | Srinivasan et al. ......... 370/230 |
| 6,333,918 | B1 | * | 12/2001 | Hummel ..................... 370/238 |

OTHER PUBLICATIONS

"PC ServerSwitch plus," Lightwave Communications, Inc., Jun. 10, 1998, pp. 1-2.
"MatriX-Hub, Video Chassis Handbook," Lightwave Communications, Inc., Jun. 10, 1998, pp. 1-10.
"PC ServerSwitch plus Product Handbook," Lightwave Communications, Inc., Jun. 10, 1998, pp. i-ii, 1-18.

* cited by examiner

*Primary Examiner*—Frantz B. Jean
(74) *Attorney, Agent, or Firm*—Stetina Brunda Garred & Brucker

(57) ABSTRACT

A switch node used for connecting a keyboard video mouse combination (KVM) and a server in an array of servers, some of which may be attached (directly) to the switch node, and others of which may be attached to another switch node in a network of interconnected switch nodes. The switch node includes at least one keyboard video mouse combination (KVM) port; a plurality of server ports; a plurality of expansion ports connecting to other switch nodes in the network of switch nodes; a cross connect, for providing an inter-connection between each KVM and one of the server ports or one of the expansion ports; and a node operating system, for providing a user, one of the KVMs an indication of each server in the array of servers, for determining a path to use for a connection between the KVM and a server, for configuring the cross connect to provide the path based on information provided by the node operating systems of other switch nodes in the network of switch nodes, and for requesting others switch nodes to configure their respective cross connects to provide the path determined by the node operating system; and an internode link port, for providing a network connection enabling communication between the node operating system of the switch node and operating system of other switch nodes in the array of switch nodes, the internode link being the connection through which the switch node learns of available connections to servers and available connections between switch nodes.

6 Claims, 4 Drawing Sheets

SWITCH NODE FOR CONNECTING A KEYBOARD VIDEO MOUSE TO SELECTED SERVERS IN A INTERCONNECTED SWITCH NODE NETWORK

CROSS-REFERENCE TO RELATED APPLICATIONS

This application is a continuation of U.S. patent application Ser. No. 09/421,494, filed Oct. 20, 1999, now issued as U.S. Pat. No. 6,615,272 issued Sep. 2, 2003.

STATEMENT RE: FEDERALLY SPONSORED RESEARCH/DEVELOPMENT

Not Applicable.

FIELD OF THE INVENTION

The present invention pertains to the field of hardware for connecting components of computers, such as a keyboard, video monitor and mouse, to a server (sometimes called the box of a computer system), and thus connecting up a computer system. More particularly, the present invention pertains to switching a connection from a keyboard, video monitor and mouse from one server to another.

BACKGROUND OF THE INVENTION

In some applications of microcomputers, it is desired to access a server in an assembly of servers as if the server were attached directly to a keyboard, video monitor and mouse (KVM), the server and KVM thus constituting a standalone microcomputer system. It is further desired to be able to switch at any time from one such server to another. With this ability, a single user, operating the KVM, can monitor the execution of any of the servers in the assembly of servers. Usually, instead of a single user, it is desired that at least two users, each operating a different KVM, be able to switch among servers in the same assembly.

The prior art teaches a switching system that achieves the desired goals. As shown in FIGS. 1A–1C, the prior art teaches a linear switch node 11 that can be used by a keyboard-video-mouse combination (KVM) 12 to switch from one server 13*a* to another server 13*b* by switching a connection through a server port 16*a* to a server port 16*b*.

Alternatively, the linear switch node can be used to connect the KVM 12 to a server 13' attached to another linear switch node 11' using a connection through an expansion port 14. The other linear switch node 11' can in turn be connected to even another switch node 11".

With this arrangement, the first linear switch node 11 can be used by a user operating the KVM 12 to access either a server 13*a* or 13*b* attached directly to the linear switch node 11, or a server 13' attached to the next linear switch node 11', or servers attached to linear switch nodes farther removed from the first linear switch 11, in a linear array of switch nodes made possible by the prior art. For this arrangement, each switch node 11 11' 11'" includes two expansion ports 14, each of which is unidirectional. Thus, for example, linear switch node 11' has an outgoing connection 14*b*' and an incoming connection 14*a*". With such an arrangement, the operator of KVM 12' downstream from the first linear switch node 11 can access only servers directly attached to the linear switch node 11' to which it is attached, or servers attached to switch nodes 11" 11'" downstream from that switch node. Further, an operator of a KVM 12 attached to the first linear switch node 11, in order to access a server 13" attached to a linear switch node 11" more than one switch node downstream from the first switch node, must have the first linear switch node 11 connect to the server 13" through the intermediate linear switch nodes 11' 11". It is not possible according to the prior art for the first linear switch node 11 to connect to a server 13" that is attached to a linear switch node 11" not in turn connected directly to the first linear switch node 11, without making use of a connection between the intermediate linear switch node 11'. Further, it is not possible for a user of a KVM 12' attached to a downstream linear switch node 11' to connect to a server 13 attached to an upstream linear switch node 11.

With such a linear array of switch nodes, if a user of a KVM 12 attached to a first linear switch node 11 desires to connect to a server 13" attached to a linear switch node 11" separated from the first switch node by an intermediate switch node 11' connections allocated to other users (because of users using KVMs 12' attached to the intermediate switch node 11') or malfunction of the intermediate switch node can impede or obstruct the desired connection.

What is needed is a switch node that allows a user of a KVM attached to the switch node to access not only the servers attached directly to the switch node, but also to access servers attached to any other switch node, with or without having to connect to intermediate switch nodes, i.e. to reach a server attached to another switch node by connecting directly to the other switch node and having the other switch node provide a connection to the attached server. Further what is needed is a way for a user of a KVM attached to a switch node anywhere in a network of switch nodes (not necessarily a linear array) to access a server connected to any other switch node in different ways, i.e. to have available a choice of connection paths to a server attached to another switch node, and so to be able to choose a preferred path depending on connections, or to still make a connection even if equipment malfunction blocks the most direct connection path.

SUMMARY OF THE INVENTION

Accordingly, the present invention provides a switch node, for connecting a keyboard video mouse (KVM) combination and a server in an array of servers in which each server is attached to the switch node or attached to another switch node, so that all of the switch nodes constitute a network of interconnected switch nodes. The switch node comprises: a KVM ports for providing a connection to an attached KVM; a plurality of server ports for providing connections to a plurality of attached servers; a plurality of expansion ports for providing connections to other switch nodes in the network of switch nodes; a cross connect, for providing connections between the KVM and one of the server ports or one of the expansion ports; a node operating system, for providing to a user of the KVM an indication of each server in the array of servers, for determining a path to use for a connection between the KVM and a server, for configuring the cross connect to provide the path and for requesting others of the switch nodes to configure their respective cross connects so as to provide the path determined; and an internode link port, for providing a network connection enabling communication between the node operating system of the switch node and the node operating system of other switch nodes in the network of switch nodes.

In another aspect of the invention, the configuring of the cross connect to provide the path is based on information provided by the node operating systems of other switch nodes in the network of switch nodes.

In a still further aspect of the invention, the requesting of others of the switch nodes to configure their respective cross connects so as to provide the path determined is according to directions provided by the switch node.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1A:
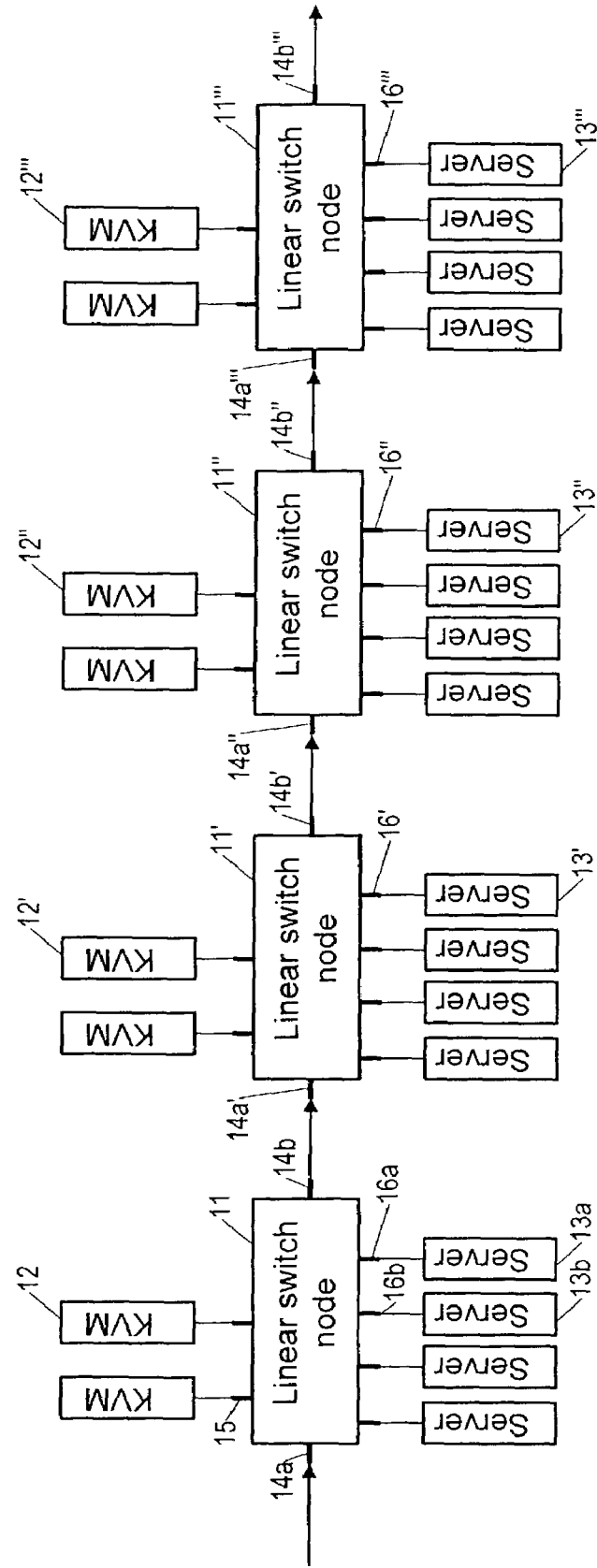
FIG. 1A is a block diagram showing a network of switch nodes according to the prior art.
Figure 1B:
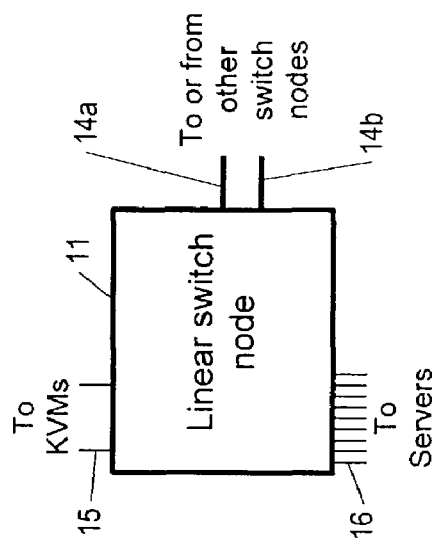
FIG. 1B is a switch node for use in a network of switch nodes according to the prior art.
Figure 1C:
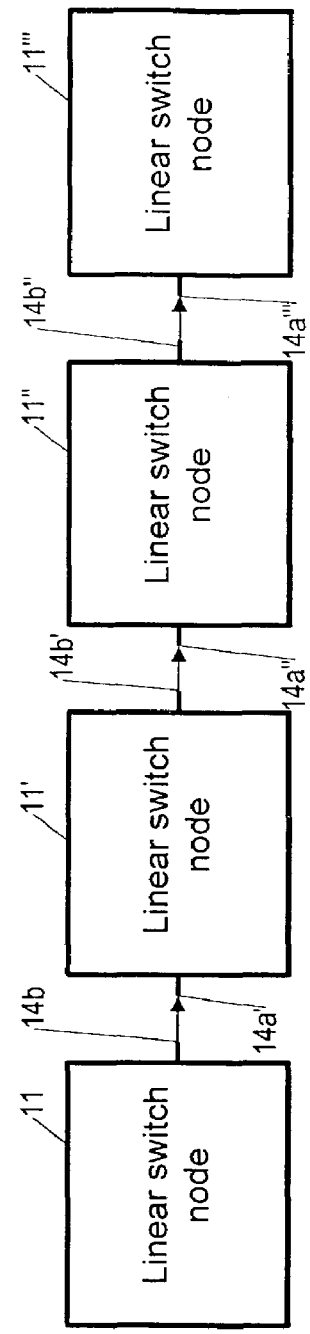
FIG. 1C is a simplified block diagram showing a network of switch nodes according to the prior art.
Figure 2A:
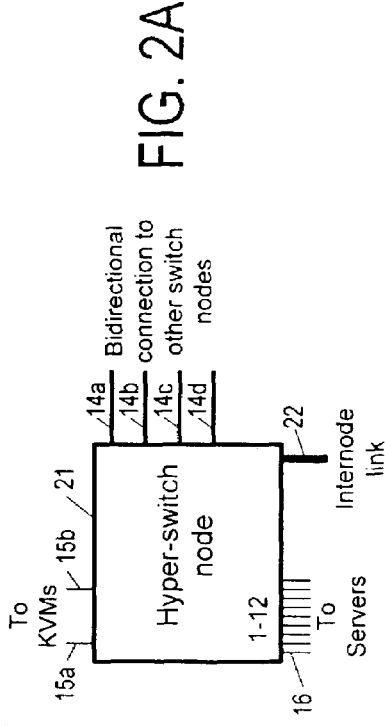
FIG. 2A is a hyper-switch node for use in a network of switch nodes according to the present invention.
Figure 2B:
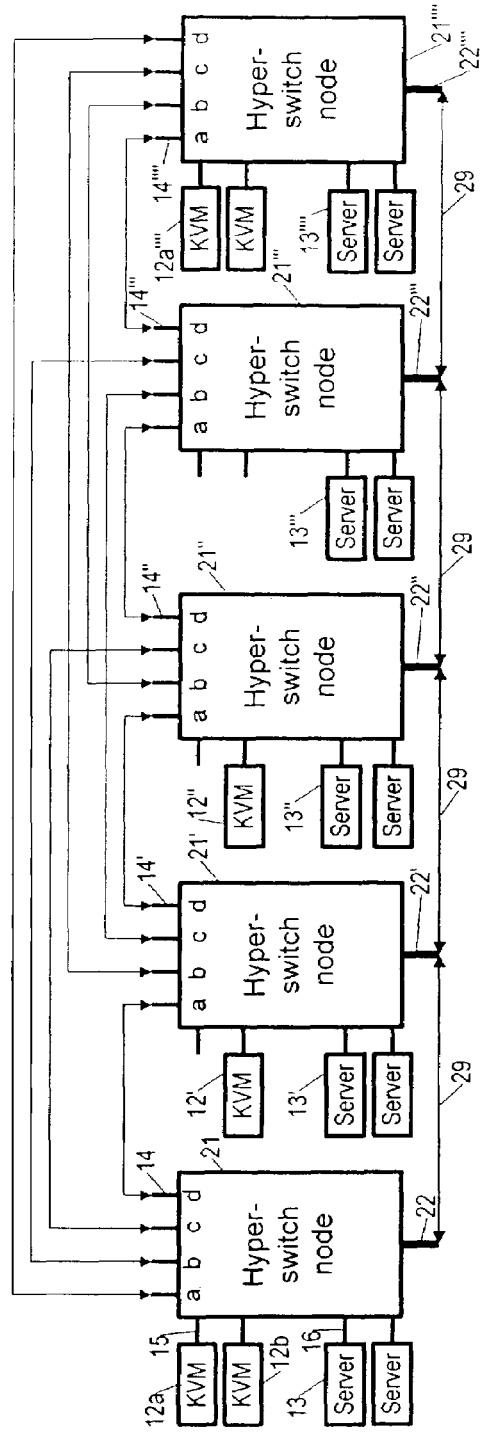
FIG. 2B is a block diagram showing one particular possible network of hyper-switch nodes according to the present invention.
Figure 3:
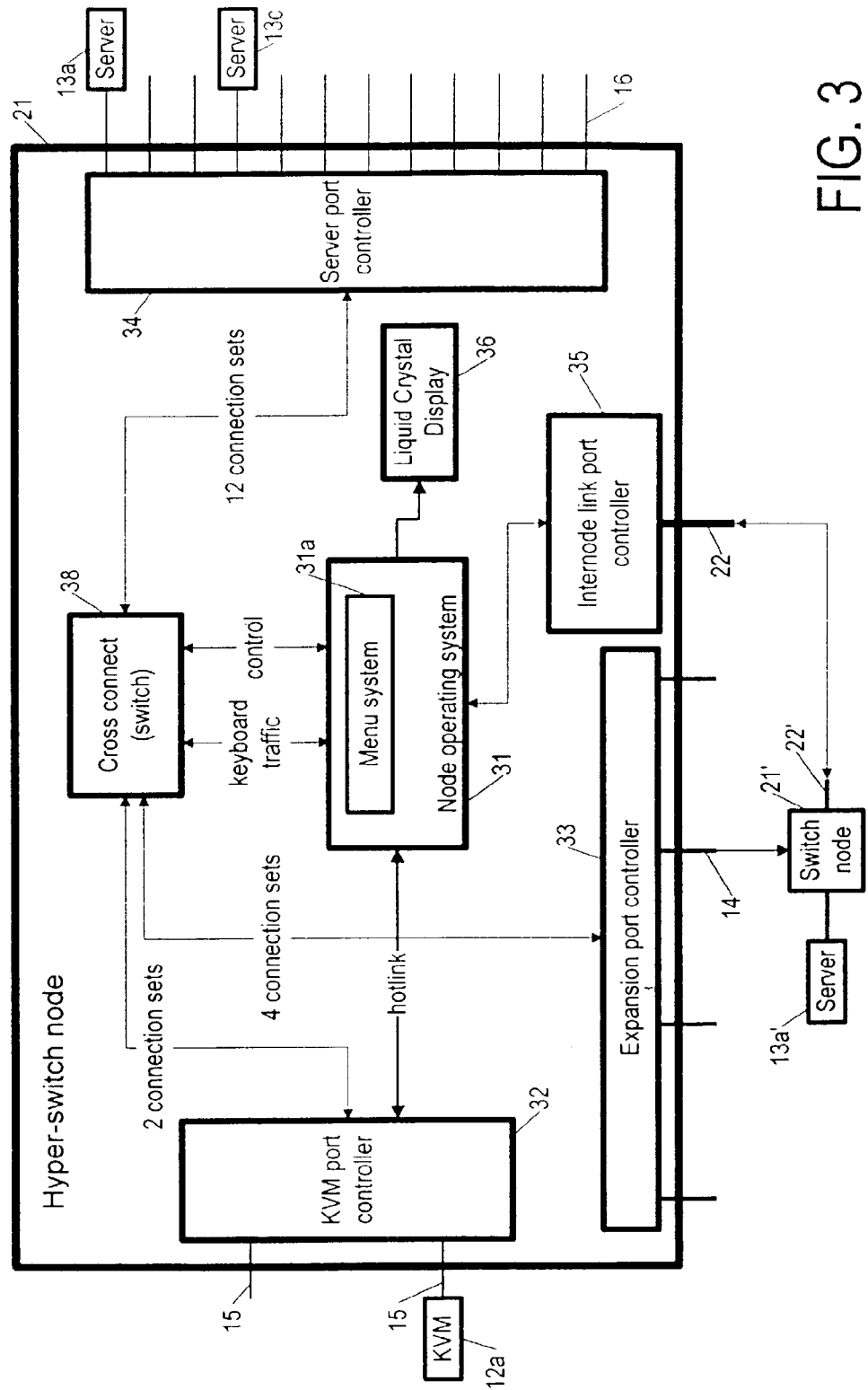
FIG. 3 is a block diagram of a hyper-switch node according to the present invention, showing the node connected to various devices including another node.

Referring now to FIGS. 2A–2B and FIG. 3, a hyper-switch node 21 according to the best mode of the present invention includes two KVM ports 15a–b for attaching keyboard video mouse combinations (KVMs) 12; twelve server ports 16 for attaching servers 13 (FIG. 3); four expansion ports 14 for connecting to other switch nodes 21' 21" 21'" 21"", each expansion port 14 accommodating a bi-directional connection; and also an (internode) link port 22 accommodating an internode link 29 (usually a bus type of connection) for connecting in a peer-to-peer network each of the hyper-switch nodes 21 21' 21" 21'"21"".

A (bi-directional) connection through an expansion port consists of three kinds of connections: a connection for a keyboard, the same kind of connection for a mouse, and, for receiving video output from a server attached to another hyper-node switch.

With four expansion ports 14, each accommodating a bi-directional connection, it is possible to completely interconnect (bi-directionally) five hyper-switch nodes 21 21' 21" 21'" 21"", as indicated in FIG. 2B. Thus, a KVM 12 attached to a first hyper-switch node 21 can access a server 13" attached to some other hyper-switch node 21" in the network of hyper-switch nodes, and, conversely, a KVM 12" attached to that other hyper-switch node 21" can access a server attached to the first hyper-switch node 21. In addition, if a direct path from one node 21 to another node 21" is blocked (by failure or in use), alternative paths exist and, if available (not blocked), can be used, as explained below.

As will be explained below, when a hyper-link node 21 is deciding what path to use to connect to another hyper-switch node 21" (to access a server 13" attached to the other hyper-switch node), the hyper-switch node 21 will use the internode link 29 provided through link ports 22 22" to determine what path to use.

Referring now to FIG. 3, a hyper-switch node 21 according to the present invention is again shown as having expansion ports 14, each for bi-directionally connecting to another hyper-switch node 21', having KVM ports 15 for attaching one or more KVMs (these connections each being the various connections required to attach each of the indicated devices), and having a link port 22 for networking the hyper-switch node 21 to other hyper-switch nodes 21' 21" 21'" 21"" (see FIG. 2B).

Internally, the hyper-switch node 21 includes a node operating system 31 having a menu system 31a for providing a user interface to a user of a KVM 12 attached to the hyper-switch node. Another central component is a cross connect (switch) 38 by which each attached (and in use) KVM is connected to either one or another attached server 13a–c, or to a server 13' attached to another hyper-node switch 21'. The switch is controlled by the node operating system 31 via a control connection; once the node operating system 31 determines the path it wants to use to establish communications between an attached KVM 12a and a server 13 (the server either attached directly or attached to another hyper-switch node), it configures the switch accordingly. The cross connect 38 has ports for accommodating the connections to each attached KVM (one set of two connections for each KVM, a connection for the keyboard and mouse, and a separate connection for the monitor), ports for each attached server (i.e. twelve sets of connections, one set per attached server), and ports for each expansion port (a set of connections for each of the four expansion ports).

A hyper-switch node 21 in the best mode of the present invention also includes other components. It includes an internode link controller 35, which enables the peer-to-peer network communication between the node operating systems of the different, networked hyper-switch nodes 21 21' 21" 21'" 21"". It also includes a KVM port controller for providing serial communication from each keyboard and mouse of each attached KVM 12a and the cross connect 38, and video communication from the cross connect 38 to the monitor of each attached KVM 12a; and also for providing communication between a KVM and the node operating system 31, via a hotlink. Inputs from the keyboard of a KVM are caused to be routed via the hotlink to the node operating system 31 by preceding the input with a special key-stroke combination. The node operating system will respond by providing video signals to the monitor of the KVM being used to communicate over the hotlink.

A hyper-switch node 21 according to the best mode of the present invention also includes a server port controller 34 for providing connections to each of twelve attached servers 13 (to enable providing keyboard and mouse signals to the servers, and for providing video signals from the servers). For connecting to other hyper-switch nodes, there is also an expansion port controller 33, accommodating bi-directional connections with four other hyper-switch nodes 21' 21" 21'" 21"". Finally, there is a liquid crystal display (LCD) 36 to enable the node operating system to signal status information even when no KVM 12 is attached.

To access a server 13 connected directly to the hyper-switch node 21, a user operates a KVM 12a attached through a KVM port 15 and interfaces with the menu system 31a, through the KVM port controller 32. Through the menu system 31a, the user can select to connect to a (directly) attached server 13a, attached through a server port 16. The node operating system 31 then commands the cross connect 38 to connect, via the respective port controllers, the server 13a to the KVM 12a. The connection provided by the cross connect 38 enables communication from the keyboard and mouse of KVM 12a (i.e. keyboard and mouse signals) to the server 13a, and for communication (video output) from the server 13*a* to the monitor of KVM 12*a*. The communication proceeds through the KVM controller 32 and the server port controller 34.

To connect to a server 13' attached to another hyper-switch node 21', i.e. any ohter server that is not directly connected server 13', a user operating the attached KVM 12*a* selects from the menu system 31*a* to connect to the non local server 13' either by name, or by pointing to the server 13' in a node topology displayed by the menu system 31*a*. The node topology displayed by the menu system 31 indicates the various connected servers using information it obtains dynamically, at the time a request is made to indicate the node topology or to provide a list of available servers 13. Once the user indicates a server 13' to which to be provided access, the node operating system 31 determines a connection path to use for the access. In case of a network of five or less hyper-switch nodes, in the preferred embodiment of four expansion ports, a direct path might be available for any server, i.e. a path through only a single additional hyper-node switch 21'. If however, the direct path is not available or if there is no direct path, the node operating system 31 will determine another path. Each hyper-switch node 21 interrogates each other hyper-switch node it is directly connected to using the connections provided through the expansion ports 14. However, all other network information is acquired via the internode link 29, by querying each other hyper-switch node 21' 21" 21'" 21"" in the network whenever such other information is needed. Then, in hunting for a path for an indirect connection, the node operating system 31 performs a path hunt algorithm, using the current state of each connection in the network acquired through the interrogation, i.e. using the acquired knowledge about each individual connection.

In determining an indirect path, the node operating system interrogates one or more other node operating systems as to what connections are available. The interrogation prompts each interrogated switch node to provide what connections to attached servers are available, as well as what direct connections to other switch nodes are available. After performing the path hunt and so determining an indirect path, the node operating system configures not only its own cross connect 38, but also requests that other of the node operating system configure their respective cross connects so as to provide each of the connections needed for the indirect path.

It is to be understood that the above-described arrangements are only illustrative of the application of the principles of the present invention. In particular, it is obvious that the present invention is not intended to be limited to an architecture in which there are in particular four expansion ports, two KVM ports, or twelve server ports.

Although such a hyper-switch node is a good choice in a wide range of real world applications, a hyper-switch node having fewer or more expansion ports or KVM ports or server ports is also useful, depending on the application. The advantages of the present invention accrue as long as there are at least two expansion ports and at least two server ports, and at least one KVM port. Beside differences such as these, numerous other modifications and alternative arrangements from what is disclosed here may be devised by those skilled in the art without departing from the spirit and scope of the present invention, and the appended claims are intended to cover such modifications and arrangements.

What is claimed is:

1. A Method for connecting a keyboard, video monitor and mouse (KVM) combination and a server in an array of servers, each server attached to a switch node or attached to another switch node, all of the switch nodes constituting a network of interconnected switch nodes, the method comprising the steps of:
   a) enabling communication between a first switch node operating system and a plurality of other switch node operating systems;
   b) providing a user of a KVM an indication of each server in the array of servers;
   c) determining a path for connecting between the KVM and a server selected by a user;
   d) configuring a cross connection for said path between the KVM and the selected server;
   e) requesting other switch nodes in the network to configure respective cross connections; and
   f) configuring of the cross connection of the other switch nodes to enable the path between the KVM and a selected server.

2. The method of claim 1 wherein the configuring of the cross connection for said path between the KVM and the selected server is based on information provided by node operating systems of other switch nodes in the network of switch nodes.

3. The method of claim 1 wherein requesting other switch nodes to configure respective cross connections is completed according to directions provided by an operating system of said first switch node.

4. A Method for connecting a keyboard, video monitor and mouse (KVM) combination and a server is an array of servers, each server attached to switch node or attached to another switch node, all of the switch nodes continuing a network of interconnected switch nodes, the method comprising the steps of:
   a) enabling communication between a first switch node operating system and a plurality of other switch node operating systems;
   b) providing a connection between an attached KVM and a KVM port;
   c) providing a connection between a plurality of attached servers and a plurality of attached server ports;
   d) providing a user of a KVM an indication of each server in the array of servers;
   e) determining a path for connecting between the KVM and a server selected by a user;
   f) configuring a cross connection for said path between the KVM port and the selected server port;
   g) requesting other switch nodes in the network to configure respective cross connections; and
   h) configuring of the cross connection of the other switch nodes to enable the path between the KVM and a selected server.

5. The method of claim 4 wherein the configuring of the cross connecting for said path between the KVM and selected server is based on information provided by node operating systems of other switch nodes in the network of switch nodes.

6. The method of claim 4 wherein requesting other switch nodes to configure respective cross connections is completed according to direction provided by an operating system of said first switch node.

* * * * *